(12) United States Patent
McClellan

(10) Patent No.: US 9,117,246 B2
(45) Date of Patent: *Aug. 25, 2015

(54) SYSTEM AND METHOD FOR PROVIDING A USER INTERFACE FOR VEHICLE MENTORING SYSTEM USERS AND INSURERS

(75) Inventor: Scott McClellan, Heber, UT (US)

(73) Assignee: inthinc Technology Solutions, Inc., West Valley City, UT (US)

( * ) Notice: Subject to any disclaimer, the term of this patent is extended or adjusted under 35 U.S.C. 154(b) by 488 days.

This patent is subject to a terminal disclaimer.

(21) Appl. No.: 12/379,083

(22) Filed: Feb. 12, 2009

(65) Prior Publication Data

US 2010/0205012 A1    Aug. 12, 2010

(51) Int. Cl.
*G06Q 40/08*        (2012.01)
*G07C 5/00*         (2006.01)
*G07C 5/08*         (2006.01)
*G06Q 30/02*        (2012.01)

(52) U.S. Cl.
CPC ............. *G06Q 40/08* (2013.01); *G07C 5/008* (2013.01); *G07C 5/085* (2013.01); *G06Q 30/0283* (2013.01)

(58) Field of Classification Search
CPC ... G06Q 40/08; G06Q 30/0283; G06Q 40/00; G06Q 40/02; G06Q 50/22; G06Q 40/06; G07C 5/008; G07C 5/08; G07C 5/085
USPC ............ 340/438, 576, 441, 905, 439, 539.12, 340/573.7; 701/1, 29, 35, 32.4, 34.4, 409, 701/93; 705/4, 10, 400, 2, 14.63; 73/489
See application file for complete search history.

(56) References Cited

U.S. PATENT DOCUMENTS

| 3,975,708 A | 8/1976 | Lusk |
| 4,344,136 A | 8/1982 | Panik |
| 4,369,427 A | 1/1983 | Drebinger et al. |

(Continued)

FOREIGN PATENT DOCUMENTS

| CA | 2071931 | 12/1993 |
| CA | 2307259 | 10/2001 |

(Continued)

OTHER PUBLICATIONS

Ogle, et al.; *Accuracy of Global Positioning System for Determining Driver Performance Parameters*; Transportation Research Record 1818; Paper No. 02-1063; pp. 12-24.

(Continued)

*Primary Examiner* — Barbara Joan Amelunxen
(74) *Attorney, Agent, or Firm* — Workman Nydegger

(57) ABSTRACT

System and method for communicating between an insurer and insured. The system detects operating characteristics of a driver or vehicle, and a cost of insuring the driver or vehicle, as decided by the insurer in consideration of the detected operating characteristics. The system provides an interface system for communicating the operating characteristics and the cost of insuring the driver or vehicle between the insurer and the insured. The system provides a vehicle monitoring system for monitoring the operating characteristics and for providing mentoring feedback to a driver, and a storage system for storing the operating characteristics. The system includes a processing system for deciding the cost of insuring the driver or vehicle based upon the monitored operating characteristics.

22 Claims, 3 Drawing Sheets

(56) References Cited

U.S. PATENT DOCUMENTS

| | | | |
|---|---|---|---|
| 4,395,624 A | 7/1983 | Wartski | |
| 4,419,654 A | 12/1983 | Funk | |
| 4,458,535 A | 7/1984 | Juergens | |
| 4,591,823 A | 5/1986 | Horvat | |
| 4,785,280 A | 11/1988 | Fubini | |
| 4,843,578 A | 6/1989 | Wade | |
| 4,926,417 A | 5/1990 | Futami | |
| 4,939,652 A | 7/1990 | Steiner | |
| 5,006,829 A | 4/1991 | Miyamoto et al. | |
| 5,032,821 A | 7/1991 | Domanico | |
| 5,074,144 A | 12/1991 | Krofchalk et al. | |
| 5,119,504 A | 6/1992 | Durboraw, III | |
| 5,223,844 A | 6/1993 | Mansell et al. | |
| 5,225,842 A | 7/1993 | Brown et al. | |
| 5,303,163 A | 4/1994 | Ebaugh et al. | 364/550 |
| 5,305,214 A | 4/1994 | Komatsu | |
| 5,309,139 A | 5/1994 | Austin | |
| 5,311,197 A | 5/1994 | Sorden et al. | |
| 5,325,082 A | 6/1994 | Rodriguez | |
| 5,347,260 A | 9/1994 | Ginzel | |
| 5,359,528 A | 10/1994 | Haendel | |
| 5,365,114 A | 11/1994 | Tsurushima | |
| 5,365,451 A | 11/1994 | Wang et al. | |
| 5,381,155 A | 1/1995 | Gerber | |
| 5,394,136 A | 2/1995 | Lammers | |
| 5,400,018 A | 3/1995 | Scholl | |
| 5,414,432 A | 5/1995 | Penny, Jr. et al. | |
| 5,422,624 A | 6/1995 | Smith | |
| 5,424,584 A | 6/1995 | Matsuda | |
| 5,430,432 A * | 7/1995 | Camhi et al. | 340/438 |
| 5,436,612 A | 7/1995 | Aduddell | |
| 5,436,837 A | 7/1995 | Gerstung | |
| 5,446,659 A | 8/1995 | Yamawaki | |
| 5,453,939 A | 9/1995 | Hoffman | |
| 5,457,439 A | 10/1995 | Kuhn | |
| 5,475,597 A | 12/1995 | Buck | |
| 5,485,116 A | 1/1996 | Cserveny et al. | |
| 5,485,161 A | 1/1996 | Vaughn | |
| 5,499,182 A * | 3/1996 | Ousborne | 701/29.6 |
| 5,521,579 A | 5/1996 | Bernhard | |
| 5,521,580 A | 5/1996 | Kaneko | |
| 5,525,960 A | 6/1996 | McCall | |
| 5,546,305 A | 8/1996 | Kondo | |
| 5,548,273 A | 8/1996 | Nicol | |
| 5,570,087 A | 10/1996 | Lemelson | |
| 5,581,464 A | 12/1996 | Woll | |
| 5,586,130 A | 12/1996 | Doyle | |
| 5,600,558 A | 2/1997 | Mearek | |
| 5,612,875 A | 3/1997 | Haendel | |
| 5,617,086 A | 4/1997 | Klashinsky et al. | |
| 5,625,337 A | 4/1997 | Medawar | |
| 5,638,077 A | 6/1997 | Martin | |
| 5,642,284 A | 6/1997 | Parupalli | |
| 5,648,755 A | 7/1997 | Yagihashi | |
| 5,659,289 A | 8/1997 | Zonkoski | |
| 5,689,067 A | 11/1997 | Klein | |
| 5,708,417 A | 1/1998 | Tallman | |
| 5,717,374 A | 2/1998 | Smith | |
| 5,719,771 A | 2/1998 | Buck | |
| 5,723,768 A | 3/1998 | Ammon | |
| 5,731,285 A | 3/1998 | Pavone et al. | |
| 5,731,785 A | 3/1998 | Lemelson et al. | |
| 5,740,548 A | 4/1998 | Hudgens | |
| 5,742,915 A | 4/1998 | Stafford | |
| 5,751,245 A | 5/1998 | Janky et al. | |
| 5,764,139 A | 6/1998 | Nojima | |
| 5,767,767 A | 6/1998 | Lima | |
| 5,777,580 A | 7/1998 | Janky et al. | |
| 5,795,997 A | 8/1998 | Gittins | |
| 5,797,134 A * | 8/1998 | McMillan et al. | 705/400 |
| 5,801,618 A | 9/1998 | Jenkins | |
| 5,801,948 A | 9/1998 | Wood | |
| 5,815,071 A | 9/1998 | Doyle | |
| 5,819,090 A | 10/1998 | Wolf et al. | |
| 5,819,198 A | 10/1998 | Peretz | |
| 5,825,283 A | 10/1998 | Camhi | |
| 5,825,284 A | 10/1998 | Dunwoody | |
| 5,829,782 A | 11/1998 | Breed et al. | |
| 5,844,475 A | 12/1998 | Horie | |
| 5,847,271 A | 12/1998 | Poublon | |
| 5,862,500 A | 1/1999 | Goodwin | |
| 5,867,093 A | 2/1999 | Dodd | |
| 5,877,678 A | 3/1999 | Donoho | |
| 5,880,674 A | 3/1999 | Ufkes | |
| 5,880,958 A | 3/1999 | Helms et al. | |
| 5,883,594 A | 3/1999 | Lau | |
| 5,892,434 A | 4/1999 | Carlson | |
| 5,907,277 A | 5/1999 | Tokunaga | |
| 5,914,654 A | 6/1999 | Smith | |
| 5,918,180 A | 6/1999 | Dimino | |
| 5,926,087 A | 7/1999 | Busch | |
| 5,928,291 A | 7/1999 | Jenkins et al. | |
| 5,941,915 A | 8/1999 | Federle et al. | 701/1 |
| 5,945,919 A | 8/1999 | Trask | |
| 5,949,330 A | 9/1999 | Hoffman | |
| 5,949,331 A | 9/1999 | Schofield | |
| 5,952,941 A | 9/1999 | Mardirossian | |
| 5,954,781 A | 9/1999 | Slepian | |
| 5,955,942 A | 9/1999 | Slifkin | |
| 5,957,986 A | 9/1999 | Coverdill | |
| 5,964,816 A | 10/1999 | Kincaid | |
| 5,969,600 A | 10/1999 | Tanguay | |
| 5,974,356 A | 10/1999 | Doyle et al. | |
| 5,978,737 A | 11/1999 | Pawlowski | |
| 5,982,278 A | 11/1999 | Cuvelier | |
| 5,987,976 A | 11/1999 | Sarangapani | |
| 5,999,125 A | 12/1999 | Kurby | |
| 6,002,327 A | 12/1999 | Boesch | |
| 6,008,724 A | 12/1999 | Thompson | |
| 6,018,293 A | 1/2000 | Smith | |
| 6,026,292 A | 2/2000 | Coppinger et al. | |
| 6,028,508 A | 2/2000 | Mason | |
| 6,028,510 A | 2/2000 | Tamam | |
| 6,037,861 A | 3/2000 | Ying | |
| 6,037,862 A | 3/2000 | Ying | |
| 6,038,496 A | 3/2000 | Dobler | |
| 6,044,315 A | 3/2000 | Honeck | |
| 6,059,066 A | 5/2000 | Lary | |
| 6,060,989 A | 5/2000 | Gehlot | |
| 6,064,886 A | 5/2000 | Perez et al. | |
| 6,064,928 A | 5/2000 | Wilson | |
| 6,064,970 A * | 5/2000 | McMillan et al. | 705/4 |
| 6,067,008 A | 5/2000 | Smith | |
| 6,067,009 A | 5/2000 | Hozuka | |
| 6,072,388 A | 6/2000 | Kyrtsos | |
| 6,073,007 A | 6/2000 | Doyle | |
| 6,075,458 A | 6/2000 | Ladner et al. | |
| 6,078,853 A | 6/2000 | Ebner | |
| 6,081,188 A | 6/2000 | Kutlucinar | |
| 6,084,870 A | 7/2000 | Wooten et al. | |
| 6,094,149 A | 7/2000 | Wilson | |
| 6,098,048 A | 8/2000 | Dashefsky | |
| 6,100,792 A | 8/2000 | Ogino | |
| 6,104,282 A | 8/2000 | Fragoso | |
| 6,108,591 A | 8/2000 | Segal et al. | |
| 6,112,145 A | 8/2000 | Zachman | |
| 6,121,922 A | 9/2000 | Mohan | |
| 6,122,591 A * | 9/2000 | Pomerantz | 701/410 |
| 6,124,810 A | 9/2000 | Segal et al. | |
| 6,130,608 A | 10/2000 | McKeown | |
| 6,131,067 A | 10/2000 | Girerd et al. | |
| 6,133,827 A | 10/2000 | Alvey | |
| 6,141,610 A | 10/2000 | Rothert | |
| 6,147,598 A | 11/2000 | Murphy | |
| 6,161,072 A | 12/2000 | Clapper | |
| 6,172,602 B1 | 1/2001 | Hasfjord | |
| 6,178,374 B1 | 1/2001 | Möhlenkamp | 701/117 |
| 6,184,784 B1 | 2/2001 | Shibuya | |
| 6,185,501 B1 | 2/2001 | Smith | |
| 6,198,995 B1 | 3/2001 | Settles | |
| 6,204,756 B1 | 3/2001 | Senyk | |
| 6,204,757 B1 | 3/2001 | Evans | |
| 6,208,240 B1 | 3/2001 | Ledesma | |
| 6,212,455 B1 | 4/2001 | Weaver | |

(56) References Cited

U.S. PATENT DOCUMENTS

| | | | |
|---|---|---|---|
| 6,216,066 B1 | 4/2001 | Goebel | |
| 6,222,458 B1 | 4/2001 | Harris | |
| 6,225,898 B1 | 5/2001 | Kamiya | |
| 6,227,862 B1 | 5/2001 | Harkness | |
| 6,229,438 B1 | 5/2001 | Kutlucinar | |
| 6,232,873 B1 | 5/2001 | Dilz | |
| 6,246,933 B1 | 6/2001 | Bague | |
| 6,246,948 B1* | 6/2001 | Thakker | 701/93 |
| 6,247,360 B1 | 6/2001 | Anderson | |
| 6,249,219 B1 | 6/2001 | Perez | |
| 6,253,129 B1 | 6/2001 | Jenkins et al. | |
| 6,253,151 B1 | 6/2001 | Ohler et al. | |
| 6,255,892 B1 | 7/2001 | Gartner | |
| 6,255,939 B1 | 7/2001 | Roth | |
| 6,262,657 B1 | 7/2001 | Okuda et al. | |
| 6,262,658 B1 | 7/2001 | O'Connor | |
| 6,265,989 B1 | 7/2001 | Taylor | |
| 6,266,588 B1 | 7/2001 | McClellan | |
| 6,278,361 B1 | 8/2001 | Magiawala | |
| 6,285,931 B1 | 9/2001 | Hattori | |
| 6,289,332 B2 | 9/2001 | Menig | |
| 6,294,988 B1 | 9/2001 | Shomura | |
| 6,294,989 B1 | 9/2001 | Schofield | |
| 6,295,492 B1 | 9/2001 | Lang | |
| 6,297,768 B1 | 10/2001 | Allen, Jr. | |
| 6,301,533 B1 | 10/2001 | Markow | |
| 6,306,063 B1 | 10/2001 | Horgan et al. | 477/108 |
| 6,308,120 B1 | 10/2001 | Good | |
| 6,308,134 B1 | 10/2001 | Croyle et al. | |
| 6,313,742 B1 | 11/2001 | Larson | |
| 6,314,367 B1* | 11/2001 | Ohler et al. | 701/484 |
| 6,320,497 B1 | 11/2001 | Fukumoto | |
| 6,331,825 B1 | 12/2001 | Ladner et al. | |
| 6,333,686 B1 | 12/2001 | Waltzer | |
| 6,337,653 B1 | 1/2002 | Bchler | |
| 6,339,739 B1 | 1/2002 | Folke | |
| 6,339,745 B1 | 1/2002 | Novik | 701/208 |
| 6,343,301 B1 | 1/2002 | Halt et al. | |
| 6,344,805 B1 | 2/2002 | Yasui | |
| 6,351,211 B1 | 2/2002 | Bussard | |
| 6,351,709 B2 | 2/2002 | King et al. | |
| 6,356,188 B1 | 3/2002 | Meyers | |
| 6,356,822 B1 | 3/2002 | Diaz | |
| 6,356,833 B2 | 3/2002 | Jeon | |
| 6,356,836 B1 | 3/2002 | Adolph | 701/208 |
| 6,359,554 B1 | 3/2002 | Skibinski | |
| 6,362,730 B2 | 3/2002 | Razavi | |
| 6,362,734 B1 | 3/2002 | McQuade | |
| 6,366,199 B1 | 4/2002 | Osborn | |
| 6,366,207 B1* | 4/2002 | Murphy | 340/576 |
| 6,378,959 B2 | 4/2002 | Lesesky | |
| 6,385,533 B1 | 5/2002 | Halt et al. | |
| 6,389,340 B1 | 5/2002 | Rayner | |
| 6,393,348 B1 | 5/2002 | Ziegler | |
| 6,401,029 B1 | 6/2002 | Kubota et al. | |
| 6,404,329 B1 | 6/2002 | Hsu | |
| 6,405,112 B1 | 6/2002 | Rayner | |
| 6,405,128 B1 | 6/2002 | Bechtolsheim et al. | 701/208 |
| 6,415,226 B1 | 7/2002 | Kozak | 701/210 |
| 6,417,764 B2* | 7/2002 | Tonkin | 340/425.5 |
| 6,424,268 B1 | 7/2002 | Isonaga | |
| 6,427,687 B1 | 8/2002 | Kirk | |
| 6,430,488 B1 | 8/2002 | Goldman | |
| 6,433,681 B1 | 8/2002 | Foo | |
| 6,438,472 B1 | 8/2002 | Tano et al. | |
| 6,441,732 B1 | 8/2002 | Laitsaari | |
| 6,449,540 B1 | 9/2002 | Rayner | |
| 6,459,365 B2 | 10/2002 | Tamura | |
| 6,459,367 B1 | 10/2002 | Green | |
| 6,459,369 B1 | 10/2002 | Wang | |
| 6,459,961 B1 | 10/2002 | Obradovich | |
| 6,459,969 B1 | 10/2002 | Bates | |
| 6,462,675 B1 | 10/2002 | Humphrey | |
| 6,472,979 B2 | 10/2002 | Schofield | |
| 6,476,763 B2 | 11/2002 | Allen, Jr. | |
| 6,480,106 B1 | 11/2002 | Crombez | |
| 6,484,035 B2 | 11/2002 | Allen, Jr. | |
| 6,484,091 B2 | 11/2002 | Shibata | |
| 6,493,650 B1 | 12/2002 | Rodgers | |
| 6,512,969 B1 | 1/2003 | Wang | |
| 6,515,596 B2 | 2/2003 | Awada | |
| 6,519,512 B1 | 2/2003 | Haas | |
| 6,523,912 B1 | 2/2003 | Bond et al. | |
| 6,525,672 B2 | 2/2003 | Chainer | |
| 6,526,341 B1 | 2/2003 | Bird et al. | |
| 6,529,159 B1 | 3/2003 | Fan et al. | |
| 6,535,116 B1 | 3/2003 | Zhou | |
| 6,542,074 B1 | 4/2003 | Tharman | |
| 6,542,794 B2 | 4/2003 | Obradovich | |
| 6,549,834 B2* | 4/2003 | McClellan et al. | 701/35 |
| 6,552,682 B1 | 4/2003 | Fan et al. | |
| 6,556,905 B1* | 4/2003 | Mittelsteadt et al. | 701/32.4 |
| 6,559,769 B2 | 5/2003 | Anthony | |
| 6,564,126 B1 | 5/2003 | Lin | |
| 6,567,000 B2 | 5/2003 | Slifkin | |
| 6,571,168 B2 | 5/2003 | Murphy | |
| 6,577,946 B2 | 6/2003 | Myr | |
| 6,587,759 B2 | 7/2003 | Obradovich | |
| 6,594,579 B1 | 7/2003 | Lowrey | |
| 6,599,243 B2 | 7/2003 | Woltermann | |
| 6,600,985 B2 | 7/2003 | Weaver | |
| 6,604,033 B1 | 8/2003 | Banet | |
| 6,609,063 B1 | 8/2003 | Bender et al. | 701/209 |
| 6,609,064 B1 | 8/2003 | Dean | 701/213 |
| 6,611,740 B2 | 8/2003 | Lowrey | |
| 6,611,755 B1 | 8/2003 | Coffee | |
| 6,622,085 B1 | 9/2003 | Amita et al. | 701/208 |
| 6,629,029 B1 | 9/2003 | Giles | |
| 6,630,884 B1 | 10/2003 | Shanmugham | |
| 6,631,322 B1 | 10/2003 | Arthur et al. | 701/211 |
| 6,633,811 B1* | 10/2003 | Aumayer | 701/409 |
| 6,636,790 B1 | 10/2003 | Lightner | |
| 6,639,512 B1 | 10/2003 | Lee | |
| 6,643,578 B2 | 11/2003 | Levine | |
| 6,651,001 B2 | 11/2003 | Apsell | |
| 6,654,682 B2 | 11/2003 | Kane et al. | |
| 6,657,540 B2 | 12/2003 | Knapp | |
| 6,662,013 B2 | 12/2003 | Takiguchi et al. | |
| 6,662,141 B2 | 12/2003 | Kaub | 702/181 |
| 6,664,922 B1 | 12/2003 | Fan | |
| 6,665,613 B2 | 12/2003 | Duvall | |
| 6,674,362 B2 | 1/2004 | Yoshioka | |
| 6,675,085 B2 | 1/2004 | Straub | |
| 6,677,854 B2 | 1/2004 | Dix | |
| 6,678,612 B1 | 1/2004 | Khawam | |
| 6,696,932 B2 | 2/2004 | Skibinski | |
| 6,701,234 B1 | 3/2004 | Vogelsang | |
| 6,703,925 B2 | 3/2004 | Steffel | |
| 6,714,894 B1* | 3/2004 | Tobey et al. | 702/188 |
| 6,718,235 B1 | 4/2004 | Borugian | |
| 6,718,239 B2 | 4/2004 | Rayner | |
| 6,718,258 B1 | 4/2004 | Barton | |
| 6,720,889 B2 | 4/2004 | Yamaki et al. | |
| 6,727,809 B1 | 4/2004 | Smith | |
| 6,728,605 B2 | 4/2004 | Lash | |
| 6,732,031 B1 | 5/2004 | Lightner | |
| 6,732,032 B1 | 5/2004 | Banet | |
| 6,737,962 B2 | 5/2004 | Mayor | |
| 6,741,169 B2 | 5/2004 | Magiawala | |
| 6,741,170 B2 | 5/2004 | Alrabady | |
| 6,745,153 B2 | 6/2004 | White | |
| 6,748,322 B1 | 6/2004 | Fernandez | |
| 6,750,761 B1 | 6/2004 | Newman | |
| 6,750,762 B1 | 6/2004 | Porter | |
| 6,756,916 B2 | 6/2004 | Yanai | |
| 6,759,952 B2 | 7/2004 | Dunbridge | |
| 6,766,244 B2 | 7/2004 | Obata et al. | 701/207 |
| 6,768,448 B2 | 7/2004 | Farmer | |
| 6,775,602 B2 | 8/2004 | Gordon | |
| 6,778,068 B2 | 8/2004 | Wolfe | |
| 6,778,885 B2 | 8/2004 | Agashe et al. | |
| 6,784,793 B2 | 8/2004 | Gagnon | |
| 6,784,832 B2 | 8/2004 | Knockeart et al. | |
| 6,788,196 B2 | 9/2004 | Ueda | |

(56) References Cited

U.S. PATENT DOCUMENTS

| | | |
|---|---|---|
| 6,788,207 B2 | 9/2004 | Wilkerson |
| 6,792,339 B2 | 9/2004 | Basson |
| 6,795,017 B1 | 9/2004 | Puranik et al. |
| 6,798,354 B2 | 9/2004 | Schuessler |
| 6,803,854 B1 | 10/2004 | Adams et al. |
| 6,807,481 B1 | 10/2004 | Gastelum |
| 6,813,549 B2 | 11/2004 | Good |
| 6,819,236 B2 | 11/2004 | Kawai |
| 6,832,141 B2 | 12/2004 | Skeen et al. |
| 6,845,314 B2 | 1/2005 | Fosseen |
| 6,845,316 B2 | 1/2005 | Yates ............ 701/117 |
| 6,845,317 B2 | 1/2005 | Craine |
| 6,847,871 B2 | 1/2005 | Malik et al. ........... 701/33 |
| 6,847,872 B2 | 1/2005 | Bodin |
| 6,847,873 B1 | 1/2005 | Li |
| 6,847,887 B1 | 1/2005 | Casino ............ 701/208 |
| 6,850,841 B1 | 2/2005 | Casino ............ 701/208 |
| 6,859,039 B2 | 2/2005 | Horie |
| 6,859,695 B2 | 2/2005 | Klausner |
| 6,865,457 B1 | 3/2005 | Mittelsteadt |
| 6,867,733 B2 | 3/2005 | Sandhu et al. |
| 6,868,386 B1 * | 3/2005 | Henderson et al. ........ 705/4 |
| 6,870,469 B2 | 3/2005 | Ueda |
| 6,873,253 B2 | 3/2005 | Veziris |
| 6,873,261 B2 | 3/2005 | Anthony |
| 6,873,998 B1 | 3/2005 | Dorum et al. |
| 6,877,007 B1 | 4/2005 | Hentzel et al. |
| 6,879,894 B1 | 4/2005 | Lightner |
| 6,885,293 B2 | 4/2005 | Okumura |
| 6,888,495 B2 | 5/2005 | Flick |
| 6,892,131 B2 | 5/2005 | Coffee |
| 6,894,606 B2 | 5/2005 | Forbes et al. ........... 340/435 |
| 6,895,332 B2 | 5/2005 | King |
| 6,909,398 B2 | 6/2005 | Knockeart et al. |
| 6,909,947 B2 * | 6/2005 | Douros et al. ........... 701/34.4 |
| 6,914,523 B2 | 7/2005 | Munch |
| 6,922,133 B2 | 7/2005 | Wolfe |
| 6,922,616 B2 | 7/2005 | Obradovich |
| 6,922,622 B2 | 7/2005 | Dulin |
| 6,925,425 B2 | 8/2005 | Remboski |
| 6,928,348 B1 | 8/2005 | Lightner |
| 6,931,309 B2 * | 8/2005 | Phelan et al. ............ 701/1 |
| 6,937,162 B2 | 8/2005 | Tokitsu |
| 6,950,013 B2 | 9/2005 | Scaman |
| 6,954,140 B2 | 10/2005 | Holler |
| 6,958,976 B2 | 10/2005 | Kikkawa |
| 6,960,168 B2 | 11/2005 | Yanagidaira et al. |
| 6,965,827 B1 | 11/2005 | Wolfson ............ 701/207 |
| 6,968,311 B2 | 11/2005 | Knockeart et al. |
| 6,970,075 B2 | 11/2005 | Cherouny |
| 6,970,783 B2 | 11/2005 | Knockeart et al. |
| 6,972,669 B2 | 12/2005 | Saito |
| 6,980,131 B1 | 12/2005 | Taylor |
| 6,981,565 B2 | 1/2006 | Gleacher |
| 6,982,636 B1 | 1/2006 | Bennie |
| 6,983,200 B2 | 1/2006 | Bodin |
| 6,988,033 B1 | 1/2006 | Lowrey |
| 6,988,034 B1 | 1/2006 | Marlatt et al. ............ 701/200 |
| 6,989,739 B2 | 1/2006 | Li |
| 7,002,454 B1 | 2/2006 | Gustafson |
| 7,002,579 B2 | 2/2006 | Olson |
| 7,005,975 B2 | 2/2006 | Lehner |
| 7,006,820 B1 | 2/2006 | Parker et al. |
| 7,019,641 B1 | 3/2006 | Lakshmanan |
| 7,023,321 B2 | 4/2006 | Brillon et al. |
| 7,023,332 B2 | 4/2006 | Saito |
| 7,024,318 B2 | 4/2006 | Fischer |
| 7,027,808 B2 | 4/2006 | Wesby |
| 7,034,705 B2 | 4/2006 | Yoshioka |
| 7,038,578 B2 | 5/2006 | Will |
| 7,042,347 B2 | 5/2006 | Cherouny |
| 7,047,114 B1 | 5/2006 | Rogers |
| 7,049,941 B2 | 5/2006 | Rivera-Cintron |
| 7,054,742 B2 | 5/2006 | Khavakh et al. ........... 701/209 |
| 7,059,689 B2 | 6/2006 | Lesesky |
| 7,069,126 B2 | 6/2006 | Bernard |
| 7,069,134 B2 | 6/2006 | Williams |
| 7,072,753 B2 | 7/2006 | Eberle |
| 7,081,811 B2 | 7/2006 | Johnston |
| 7,084,755 B1 | 8/2006 | Nord |
| 7,088,225 B2 | 8/2006 | Yoshioka |
| 7,089,116 B2 | 8/2006 | Smith |
| 7,091,880 B2 | 8/2006 | Sorensen |
| 7,098,812 B2 | 8/2006 | Hirota |
| 7,099,750 B2 | 8/2006 | Miyazawa |
| 7,099,774 B2 | 8/2006 | King |
| 7,102,496 B1 | 9/2006 | Ernst |
| 7,109,850 B2 | 9/2006 | Kawazoe et al. |
| 7,109,853 B1 | 9/2006 | Mattson |
| 7,113,081 B1 | 9/2006 | Reichow |
| 7,113,107 B2 | 9/2006 | Taylor |
| 7,117,075 B1 | 10/2006 | Larschan et al. |
| 7,119,696 B2 | 10/2006 | Borugian |
| 7,124,027 B1 | 10/2006 | Ernst |
| 7,124,088 B2 | 10/2006 | Bauer et al. |
| 7,129,825 B2 | 10/2006 | Weber |
| 7,132,934 B2 | 11/2006 | Allison |
| 7,132,937 B2 | 11/2006 | Lu |
| 7,132,938 B2 | 11/2006 | Suzuki |
| 7,133,755 B2 | 11/2006 | Salman |
| 7,135,983 B2 | 11/2006 | Filippov |
| 7,138,916 B2 | 11/2006 | Schwartz |
| 7,139,661 B2 | 11/2006 | Holze |
| 7,142,196 B1 | 11/2006 | Connor et al. |
| 7,145,442 B1 | 12/2006 | Wai |
| 7,149,206 B2 | 12/2006 | Pruzan |
| 7,155,321 B2 | 12/2006 | Bromley et al. ............ 701/29 |
| 7,161,473 B2 | 1/2007 | Hoshal |
| 7,164,986 B2 | 1/2007 | Humphries |
| 7,170,390 B2 | 1/2007 | Quiñones |
| 7,170,400 B2 | 1/2007 | Cowelchuk |
| 7,174,243 B1 | 2/2007 | Lightner |
| 7,176,813 B2 | 2/2007 | Kawamata et al. |
| 7,180,407 B1 | 2/2007 | Guo |
| 7,180,409 B2 | 2/2007 | Brey |
| 7,183,942 B2 * | 2/2007 | Rock et al. ............ 340/905 |
| 7,187,271 B2 | 3/2007 | Nagata |
| 7,188,025 B2 * | 3/2007 | Hudson, Jr. ............ 701/117 |
| 7,196,629 B2 | 3/2007 | Ruoss |
| 7,197,500 B1 | 3/2007 | Israni et al. ............ 707/100 |
| 7,216,022 B2 | 5/2007 | Kynast et al. ............ 701/1 |
| 7,216,035 B2 | 5/2007 | Hörtner |
| 7,218,211 B2 | 5/2007 | Ho |
| 7,218,924 B2 | 5/2007 | McArdle |
| 7,222,009 B2 | 5/2007 | Hijikata |
| 7,225,065 B1 | 5/2007 | Hunt |
| 7,228,211 B1 | 6/2007 | Lowrey |
| 7,233,235 B2 | 6/2007 | Pavlish |
| 7,236,862 B2 | 6/2007 | Kanno |
| 7,239,948 B2 | 7/2007 | Nimmo |
| 7,256,686 B2 | 8/2007 | Koutsky |
| 7,256,700 B1 | 8/2007 | Ruocco |
| 7,256,702 B2 | 8/2007 | Isaacs |
| 7,260,497 B2 | 8/2007 | Watabe |
| RE39,845 E | 9/2007 | Hasfjord |
| 7,269,507 B2 | 9/2007 | Cayford ............ 701/208 |
| 7,269,530 B1 | 9/2007 | Lin |
| 7,271,716 B2 | 9/2007 | Nou |
| 7,273,172 B2 | 9/2007 | Olsen |
| 7,280,046 B2 | 10/2007 | Berg |
| 7,283,904 B2 | 10/2007 | Benjamin |
| 7,286,917 B2 | 10/2007 | Hawkins |
| 7,286,929 B2 | 10/2007 | Staton |
| 7,289,024 B2 | 10/2007 | Sumcad |
| 7,289,035 B2 | 10/2007 | Nathan |
| 7,292,152 B2 | 11/2007 | Torkkola |
| 7,292,159 B2 | 11/2007 | Culpepper |
| 7,298,248 B2 | 11/2007 | Finley |
| 7,298,249 B2 | 11/2007 | Avery |
| 7,301,445 B2 | 11/2007 | Moughler |
| 7,317,383 B2 | 1/2008 | Ihara |
| 7,317,392 B2 | 1/2008 | DuRocher |
| 7,317,927 B2 | 1/2008 | Staton |
| 7,319,848 B2 | 1/2008 | Obradovich |

(56) References Cited

U.S. PATENT DOCUMENTS

| | | | |
|---|---|---|---|
| 7,321,294 B2 | 1/2008 | Mizumaki | |
| 7,321,825 B2 | 1/2008 | Ranalli | |
| 7,323,972 B2 | 1/2008 | Nobusawa | |
| 7,323,974 B2 | 1/2008 | Schmid | |
| 7,323,982 B2 | 1/2008 | Staton | |
| 7,327,239 B2 | 2/2008 | Gallant | |
| 7,327,258 B2 | 2/2008 | Fast | |
| 7,333,883 B2 | 2/2008 | Geborek | |
| 7,339,460 B2 | 3/2008 | Lane | |
| 7,349,782 B2 | 3/2008 | Churchill | |
| 7,352,081 B2 | 4/2008 | Taurasi | |
| 7,355,508 B2 | 4/2008 | Mian | |
| 7,362,239 B2 | 4/2008 | Franczyk et al. | |
| 7,365,639 B2 | 4/2008 | Yuhara | |
| 7,366,551 B1 | 4/2008 | Hartley | |
| 7,375,624 B2 | 5/2008 | Hines | |
| 7,376,499 B2 | 5/2008 | Salman | |
| 7,378,946 B2 | 5/2008 | Lahr | |
| 7,378,949 B2 | 5/2008 | Chen | |
| 7,386,394 B2 | 6/2008 | Shulman | |
| 7,397,363 B2 | 7/2008 | Joao | |
| 7,421,334 B2 | 9/2008 | Dahlgren et al. | 701/117 |
| 7,433,889 B1 | 10/2008 | Barton | 707/104.1 |
| 7,447,509 B2 | 11/2008 | Cossins et al. | 455/457 |
| 7,499,949 B2 | 3/2009 | Barton | 707/104.1 |
| 7,565,230 B2 | 7/2009 | Gardner et al. | 701/35 |
| 7,584,033 B2 | 9/2009 | Mittelsteadt et al. | |
| 7,589,643 B2 | 9/2009 | Dagei et al. | |
| 7,671,727 B2 | 3/2010 | Flick | |
| 7,671,752 B2 | 3/2010 | Sofer | |
| 7,747,410 B2 | 6/2010 | Van Esch | |
| 7,783,406 B2 | 8/2010 | Rothschild | |
| 7,821,421 B2 | 10/2010 | Tamir et al. | |
| 7,859,392 B2 * | 12/2010 | McClellan et al. | 340/441 |
| 7,880,642 B2 | 2/2011 | Gueziec | 340/905 |
| 7,898,388 B2 | 3/2011 | Ehrman et al. | 340/5.8 |
| 7,941,258 B1 | 5/2011 | Mittelsteadt et al. | 701/35 |
| 8,044,809 B2 | 10/2011 | Farmer | |
| 8,090,598 B2 | 1/2012 | Bauer et al. | |
| 8,314,708 B2 | 11/2012 | Gunderson et al. | |
| 8,428,307 B2 | 4/2013 | Bradai et al. | |
| 8,630,768 B2 | 1/2014 | McClellan et al. | |
| 2001/0014849 A1 | 8/2001 | King et al. | |
| 2001/0018628 A1 | 8/2001 | Jenkins et al. | 701/35 |
| 2002/0019703 A1 | 2/2002 | Levine | |
| 2002/0024444 A1 | 2/2002 | Hiyama et al. | 340/576 |
| 2002/0026334 A1* | 2/2002 | Igoe | 705/4 |
| 2002/0029226 A1 | 3/2002 | Li et al. | |
| 2002/0111725 A1* | 8/2002 | Burge | 701/29 |
| 2002/0116228 A1* | 8/2002 | Bauer et al. | 705/4 |
| 2002/0120371 A1* | 8/2002 | Leivian et al. | 701/1 |
| 2002/0126023 A1 | 9/2002 | Awada | |
| 2002/0173881 A1 | 11/2002 | Lash et al. | |
| 2003/0016636 A1 | 1/2003 | Tari et al. | |
| 2003/0045273 A1 | 3/2003 | Pyhalammi et al. | |
| 2003/0052797 A1 | 3/2003 | Rock et al. | |
| 2003/0055555 A1 | 3/2003 | Knockeart et al. | |
| 2003/0060950 A1 | 3/2003 | McKeown et al. | |
| 2003/0125854 A1 | 7/2003 | Kawasaki et al. | |
| 2003/0169185 A1 | 9/2003 | Taylor | |
| 2004/0039504 A1 | 2/2004 | Coffee et al. | |
| 2004/0039609 A1* | 2/2004 | Burkitt | 705/4 |
| 2004/0054687 A1 | 3/2004 | McDonough | |
| 2004/0066330 A1 | 4/2004 | Knockeart et al. | |
| 2004/0077339 A1 | 4/2004 | Martens | |
| 2004/0083041 A1 | 4/2004 | Skeen et al. | |
| 2004/0107037 A1 | 6/2004 | Straub | |
| 2004/0107220 A1 | 6/2004 | Natesan et al. | |
| 2004/0139034 A1* | 7/2004 | Farmer | 705/400 |
| 2004/0142672 A1 | 7/2004 | Stankewitz | |
| 2004/0153362 A1* | 8/2004 | Bauer et al. | 705/10 |
| 2004/0172418 A1 | 9/2004 | Dorum et al. | |
| 2004/0186661 A1 | 9/2004 | Barton | |
| 2004/0210353 A1 | 10/2004 | Rice | 701/1 |
| 2004/0225557 A1 | 11/2004 | Phelan et al. | |
| 2004/0236474 A1 | 11/2004 | Chowdhary et al. | 701/1 |
| 2004/0236475 A1 | 11/2004 | Chowdhary | |
| 2004/0252027 A1 | 12/2004 | Torkkola et al. | |
| 2004/0254698 A1 | 12/2004 | Hubbard et al. | |
| 2004/0257245 A1 | 12/2004 | Jo | |
| 2004/0260579 A1 | 12/2004 | Tremiti | |
| 2005/0021270 A1 | 1/2005 | Hong et al. | |
| 2005/0049765 A1* | 3/2005 | Chetia et al. | 701/29 |
| 2005/0064835 A1 | 3/2005 | Gusler | |
| 2005/0065711 A1 | 3/2005 | Dahlgren et al. | |
| 2005/0091018 A1* | 4/2005 | Craft | 703/8 |
| 2005/0091175 A9* | 4/2005 | Farmer | 705/400 |
| 2005/0096809 A1 | 5/2005 | Skeen et al. | |
| 2005/0102098 A1 | 5/2005 | Montealegre et al. | |
| 2005/0131597 A1 | 6/2005 | Raz et al. | |
| 2005/0137757 A1 | 6/2005 | Phelan et al. | 701/1 |
| 2005/0171663 A1* | 8/2005 | Mittelsteadt et al. | 701/35 |
| 2006/0053038 A1* | 3/2006 | Warren et al. | 705/4 |
| 2006/0055565 A1* | 3/2006 | Kawamata et al. | 340/995.13 |
| 2006/0154687 A1 | 7/2006 | McDowell | |
| 2006/0193749 A1 | 8/2006 | Ghazarian et al. | |
| 2006/0253307 A1* | 11/2006 | Warren et al. | 705/4 |
| 2007/0005240 A1* | 1/2007 | Oumi et al. | 701/209 |
| 2007/0005404 A1* | 1/2007 | Raz et al. | 705/4 |
| 2007/0005609 A1 | 1/2007 | Breed | |
| 2007/0027583 A1 | 2/2007 | Tamir et al. | |
| 2007/0027726 A1* | 2/2007 | Warren et al. | 705/4 |
| 2007/0050130 A1 | 3/2007 | Grimm et al. | |
| 2007/0057781 A1 | 3/2007 | Breed | |
| 2007/0061155 A1 | 3/2007 | Ji et al. | |
| 2007/0126601 A1 | 6/2007 | Park | |
| 2007/0229234 A1 | 10/2007 | Smith | |
| 2007/0236342 A1 | 10/2007 | Hines et al. | |
| 2007/0260363 A1 | 11/2007 | Miller | |
| 2007/0293206 A1 | 12/2007 | Lund | |
| 2008/0027642 A1 | 1/2008 | Winberry et al. | |
| 2008/0030316 A1 | 2/2008 | Flick | |
| 2008/0046274 A1 | 2/2008 | Geelen et al. | |
| 2008/0059055 A1 | 3/2008 | Geelen et al. | |
| 2008/0064413 A1 | 3/2008 | Breed | |
| 2008/0065325 A1 | 3/2008 | Geelen et al. | |
| 2008/0082225 A1 | 4/2008 | Barrett | |
| 2008/0120175 A1 | 5/2008 | Doering | |
| 2008/0177469 A1 | 7/2008 | Geelen et al. | |
| 2008/0221787 A1 | 9/2008 | Vavrus | |
| 2008/0243558 A1* | 10/2008 | Gupte | 705/4 |
| 2008/0252487 A1 | 10/2008 | McClellan et al. | |
| 2008/0255722 A1 | 10/2008 | McClellan et al. | |
| 2008/0255888 A1 | 10/2008 | Berkobin | |
| 2008/0258890 A1 | 10/2008 | Follmer et al. | |
| 2008/0262670 A1 | 10/2008 | McClellan et al. | |
| 2008/0296968 A1 | 12/2008 | Culbert | |
| 2008/0319602 A1 | 12/2008 | McClellan et al. | |
| 2009/0024273 A1* | 1/2009 | Follmer et al. | 701/35 |
| 2009/0024419 A1 | 1/2009 | McClellan et al. | |
| 2009/0079555 A1 | 3/2009 | Aguirre De Carcer et al. | |
| 2010/0030459 A1 | 2/2010 | Geelen et al. | |
| 2010/0030586 A1* | 2/2010 | Taylor et al. | 705/4 |
| 2010/0036610 A1* | 2/2010 | Urciuoli et al. | 701/213 |
| 2010/0131189 A1 | 5/2010 | Geelen et al. | |
| 2010/0131304 A1* | 5/2010 | Collopy et al. | 705/4 |
| 2010/0207751 A1 | 8/2010 | Follmer et al. | |
| 2010/0265074 A1 | 10/2010 | Namba et al. | |
| 2011/0179080 A1 | 7/2011 | Miyazaki et al. | |
| 2011/0267205 A1 | 11/2011 | McClellan et al. | |
| 2012/0181765 A1 | 7/2012 | Hill et al. | |

FOREIGN PATENT DOCUMENTS

| | | | |
|---|---|---|---|
| CA | 2631103 | 11/2008 | |
| DE | 197 00 353 A1 | 7/1998 | B60K 28/00 |
| EP | 0843177 | 5/1998 | |
| EP | 0921509 | 6/1999 | |
| EP | 1811481 | 7/2007 | |
| GB | 2434346 | 7/2007 | |
| GB | 2454224 | 5/2009 | |
| JP | 2004326492 | 11/2004 | |
| JP | 2005-250825 | 9/2005 | |
| JP | 2007235530 | 9/2007 | |

(56) References Cited

FOREIGN PATENT DOCUMENTS

| WO | WO 03/009175 | * | 1/2003 | ............. G06F 17/30 |
|---|---|---|---|---|
| WO | WO 2005109273 | | 11/2005 | |
| WO | WO2005109369 | | 11/2005 | |
| WO | WO 2008045320 | | 8/2008 | |
| WO | WO2008109477 | | 9/2008 | |
| WO | WO 2013033756 | | 3/2013 | |
| WO | WO 2013050548 | | 4/2013 | |

OTHER PUBLICATIONS

Shen, et al.; *A computer Assistant for Vehicle Dispatching with Learning Capabilities*; Annals of Operations Research 61; pp. 189-211, 1995.
Tijerina, et al.; *Final Report Supplement; Heavy Vehicle Driver Workload Assessment; Task 5: Workload Assessment Protocol*; U.S. Department of Transportation; 69 pages, Oct. 1996.
Myra Blanco; *Effects of In-Vehicle Information System (IVIS) Tasks on the Information Processing Demands of a Commercial Vehicle Operations (CVO) Driver*; 230 pages, 1999.
U.S. Appl. No. 11/805,238, Jul. 30, 2009, Office Action.
U.S. Appl. No. 11/755,556, Sep. 1, 2009, Office Action.
U.S. Appl. No. 11/779,176, Mar. 17, 2010, Office Action.
U.S. Appl. No. 11/805,238, Apr. 26, 2010, Notice of Allowance.
U.S. Appl. No. 11/755,556, May 4, 2010, Office Action.
U.S. Appl. No. 11/768,056, Jan. 18, 2011, Office Action.
U.S. Appl. No. 11/779,176, Aug. 18, 2011, Office Action.
U.S. Appl. No. 11/768,056, Sep. 16, 2011, Office Action.
U.S. Appl. No. 11/779,178, Nov. 2, 2011, Office Action.
U.S. Appl. No. 11/768,056, Feb. 16, 2012, Office Action.
U.S. Appl. No. 11/779,178, May 31, 2012, Office Action.
U.S. Appl. No. 11/768,056, Jul. 19, 2012, Office Action.
U.S. Appl. No. 11/779,176, Dec. 3, 2012, Office Action.
U.S. Appl. No. 11/779,178, Dec. 20, 2012, Office Action.
U.S. Appl. No. 11/779,178, May 9, 2013, Office Action.
U.S. Appl. No. 11/768,056, Jun. 21, 2013, Office Action.
U.S. Appl. No. 11/779,176, Jul. 1, 2013, Notice of Allowance.
U.S. Appl. No. 12/975,489, Oct. 3, 2013, Office Action.
Zhu et al., "A Small Low-Cost Hybrid Orientation system and Its Error Analysis", Sensors Journal, IEEE—vol. 9, Issue 3, Digital Object Identifier: 10.1109/JSEN.2008.2012196; Publication Year: Mar. 2009, pp. 223-230.
Almazan et al., "Full auto-calibration of a smartphone on board a vehicle using IMU and GPS embedded sensors", Intelligent Vehicles Symposium (IV), 2013 IEEE; Digital Object Identifier: 10.1109/IVS.2013.6629658; Publication Year: Jun. 2013, pp. 1374-1380.
Lupton et al., "Efficient Integration of Inertial Observations Into Visual SLAM Without Initialization", Intelligent Robots and Systems, 2009, IROS 2009, IEEE/RSJ International Conference on: Digital Object Identifier: 10.1109/IROS.2009.5354267, Publication Year: Oct. 2009, pp. 1547-1552.
Mungula et al., "Attitude and Heading System Based on EKF Total State Configuration", Industrial Electronics (ISIE), 2011 IEEE International Symposium on; Digital Object Identifier: 10.1109/ISIE.2011.5984493; Publication Year: Jun. 2011, pp. 2147-2152.
Huddle et al., "Application of Inertial Navigation Systems to Geodetic Position and Gravity Vector Survey", Decision and Control including the 17th Symposium on Adaptive Processes, 1978 IEEE Conference on; vol. 17, Part 1; Digital Object Identifier: 10.1109/CDC.1978.267967; Publication Year: 1978, pp. 459-465.(The month of Publication is irrelevant since the year of Publication is clearly prior to the filing of the Application).
Zhao Yan et al., "Attitude Measurement of Driver's Head Based on Accelerometer and Magnetoresistive Sensor", Fluid Power and Mechatronics (FPM), 2011 International Conference on; Digital Object Identifier: 10.1109/FPM.2011.6045836; Publication Year: Aug. 2011, pp. 613-617.
Google Maps, "Google Maps", Available at least as early as Dec. 29, 2014. Whole Document.
U.S. Appl. No. 12/379,153, Jul. 29, 2011, Office Action.
U.S. Appl. No. 12/379,153, Dec. 16, 2011, Office Action.
U.S. Appl. No. 12/379,153, Jul. 31, 2012, Notice of Allowance.
U.S. Appl. No. 12/379,153, Aug. 14, 2013, Notice of Allowance.
U.S. Appl. No. 12/379,153, Mar. 17, 2014, Office Action.
U.S. Appl. No. 12/975,489, Oct. 1, 2014, Notice of Allowance.
U.S. Appl. No. 12/379,153, Oct. 6, 2014, Office Action.
U.S. Appl. No. 12/379,153, Jan. 9, 2015, Notice of Allowance.
U.S. Appl. No. 11/778,178, Feb. 6, 2014, Office Action.
U.S. Appl. No. 11/768,056, Feb. 6, 2014, Office Action.
U.S. Appl. No. 11/755,556, Jun. 10, 2014, Office Action.
U.S. Appl. No. 11/779,178, May 27, 2014, Notice of Allowance.
U.S. Appl. No. 11/755,556, Mar. 30, 2015, Notice of Allowance.

* cited by examiner

SYSTEM AND METHOD FOR PROVIDING A USER INTERFACE FOR VEHICLE MENTORING SYSTEM USERS AND INSURERS

CROSS-REFERENCE TO RELATED APPLICATIONS

This application relates to the following co-pending and commonly assigned patent application: U.S. patent application Ser. No. 11/779,178, filed Jul. 17, 2007, entitled "System and Method for Categorizing Driving Behavior Using Driver Mentoring and/or Monitoring Equipment to Determine an Underwriting Risk," which application is hereby incorporated by reference herein in its entirety.

TECHNICAL FIELD

The present invention relates generally to a system and method for mentoring users and insurers to using a vehicle monitoring system.

BACKGROUND

Insurance rates are set for broad, generalized categories of drivers and vehicles without the capability to set future insurance rates based upon the driving habits of an individual driver. U.S. Pat. No. 5,797,134 ("the '134 patent") and U.S. Pat. No. 6,064,970 ("the '970 patent"), both entitled "Motor Vehicle Monitoring System for Determining a Cost of Insurance," and U.S. Pat. No. 6,868,386 ("the '386 patent"), entitled "Monitoring System for Determining and Communicating a Cost of Insurance," disclose a system and method in which previously set insurance rates are adjusted, after the coverage term, based upon driver behavior during the term of the insurance contract, and applied to the past coverage term. The '134 patent, the '970 patent, and the '386 patent are each hereby incorporated by reference. These patents disclose a passive vehicle monitoring system that observes driver behavior and vehicle operation, but that does not provide any mentoring, warnings or feedback to the driver. In particular, the disclosed systems do not provide any mentoring, warnings or feedback based upon the driver's behavior or operation of the vehicle. There is no teaching, discussion or attempt by those patents to "improve" an operator's driving performance or relate the operator's driving performance with real-time and/or future adjustments of insurance coverage and/or costs.

The '134, '970, and '386 patents and other known systems do not provide a user interface, website or portal that allows insurers to bid on providing insurance coverage to groups of one or more drivers based upon known driver performance. Instead, known systems set driver insurance rates based upon a standard insurance rating profile. The '134, '970, and '386 patents do not disclose a system or method for categorizing or grading driver skill or behavior for the purpose of setting current and/or future insurance rates or for grouping drivers for consideration by insurance companies. Current systems also lack the capability for real-time metered pricing, such as calculating an insurance price, rate or premium in real-time according to how a driver drives, where a vehicle is driven, the condition of a vehicle, when a vehicle is driven, and under what conditions a vehicle is driven (e.g. weather, road construction, or traffic conditions). The insurance rates disclosed in known systems are based upon a driver or insured profile that is established before monitoring the driver's performance.

SUMMARY OF THE INVENTION

The present invention is directed to a system and method for communicating between an insurer and insured. The system detects operating characteristics of an entity, and a cost of insuring the entity, as decided by the insurer in consideration of the detected operating characteristics. The entity may be a driver or a vehicle. The system provides an interface system for communicating the operating characteristics and the cost of insuring the entity between the insurer and the insured. The system provides a vehicle monitoring system for monitoring the operating characteristics and for providing mentoring feedback to a driver, and a storage system for storing the operating characteristics. The system includes a processing system for deciding the cost of insuring the entity based upon the monitored operating characteristics.

Further features of the present invention, as well as the structure and operation of various embodiments of the present invention are described in detail below with reference to the accompanying drawing.

BRIEF DESCRIPTION OF THE DRAWING

For a more complete understanding of the present invention, and the advantages thereof, reference is now made to the following description taken in conjunction with the accompanying drawings, in which.

DETAILED DESCRIPTION OF ILLUSTRATIVE EMBODIMENTS

Figure 1:
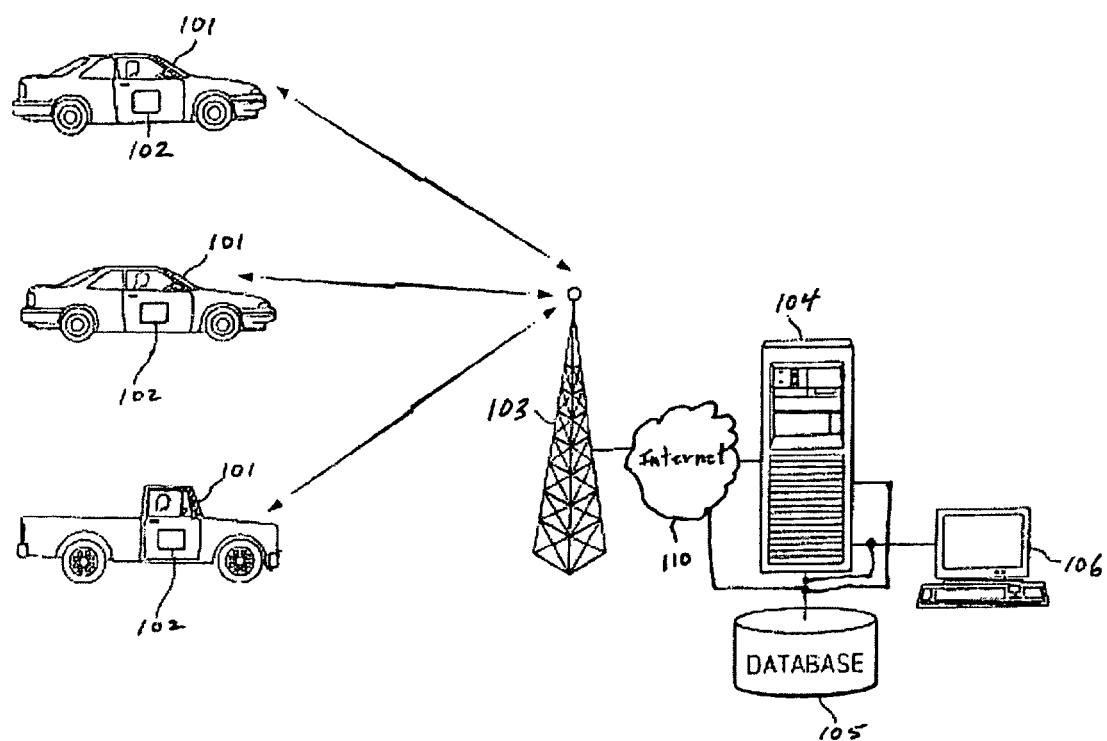
FIG. 1 illustrates one embodiment of a system for implementing the present invention.

The present invention provides many applicable inventive concepts that can be embodied in a wide variety of specific contexts. The specific embodiments discussed are merely illustrative of specific ways to make and use the invention, and do not limit the scope of the invention.

Driver performance may be measured using vehicle monitoring equipment that is installed in a vehicle. The equipment collects information, such as the vehicle's speed, acceleration, and location. The system may capture data identifying where the vehicle is driven, when the vehicle is driven, how the vehicle is driven (i.e. driver performance), and current condition of the vehicle. Such vehicle monitoring devices are described in U.S. patent application Ser. No. 11/805,237, filed on May 22, 2007, entitled "System and Method for Monitoring Vehicle Parameters and Driver Behavior," the disclosure of which is hereby incorporated by reference herein in its entirety. The vehicle monitoring system may receive inputs from internal and external sources and sensors such as accelerometers, global positioning systems (GPS), vehicle on-board diagnostic systems, seatbelt sensors, wireless device, or cell phone use detectors, alcohol vapor detectors, or trans-dermal ethanol detection and/or a road speeds database. The vehicle monitoring system may be used to evaluate and grade driver behavior, as described in U.S. patent application Ser. No. 11/755,556, filed on May 30, 2007, entitled "System and Method for Evaluating Driver Behavior," the disclosure of which is hereby incorporated by reference herein in its entirety. The vehicle monitoring system may also be used to provide feedback and mentoring to the driver in order improve the driver's performance and driving behavior, such as described in U.S. patent application Ser. No. 11/768,056, filed on Jun. 25, 2007, entitled "System and Method for Monitoring and Improving Driver Behavior," the disclosure of which is hereby incorporated by reference herein in its entirety.

Using a vehicle monitoring and mentoring system, such as one of the devices described in the above-referenced patent applications, a driver's performance can be evaluated. The driver's performance may also be improved, based on mentoring feedback or warnings from the vehicle monitoring system. Driving performance may be evaluated as a letter grade (for example, A, B, C, D, or F), a number, a percentage, or using a more general category (for example, Excellent, Good, Fair, or Poor). The driver's performance may be evaluated against parameters, thresholds or criteria set in the vehicle monitoring system. Speed thresholds may be set to determine if the driver has exceeded a posted speed limit and/or a maximum selected speed. Multiple levels of speed thresholds may be set and, if any are exceeded, the vehicle monitoring system may also determine the extent and duration of each violation. For example, U.S. patent application Ser. No. 11/805,238, filed May 22, 2007, entitled "System and Method for Monitoring and Updating Speed-By-Street Data," the disclosure of which is hereby incorporated by reference herein in its entirety, discloses a system and method for detecting when a speed threshold has been exceeded. A speed-by-street database may be used to track the posted speeds for streets so that the current speed of vehicles on the streets may be evaluated for speeding conditions. Other features and conditions of the streets may also be tracked in a database, such as delays due to construction, weather or lane closures, speed traps, traffic signal outages, and actual or average observed speeds.

Acceleration thresholds may be set in the vehicle monitoring system to determine if the driver starts, stops or turns too aggressively. Multiple levels of acceleration thresholds may be established as described above for speed thresholds. Other parameters, thresholds and criteria may be established to monitor and evaluate other driver and vehicle operating conditions. For example, thresholds may also be set in other sensors such as seatbelt, detection of a wireless device (e.g., the use of a cellular telephone and/or text messaging), and alcohol vapor detectors to further evaluate the driver's behavior. GPS positioning systems may also be used to detect low frequency steering correction (which can be indicative of impaired driving, distracted driving, fatigue, and/or lane departure). The vehicle monitoring system may record the extent and duration to which any threshold is violated and uses that information to evaluate the driver.

FIG. 1 illustrates one embodiment of a system for implementing the present invention. Vehicle monitoring and/or mentoring equipment 101 is installed in a plurality of vehicles 102. Monitoring devices 101 may be self contained, such as a single unit mounted on a windshield or dashboard of vehicle 102. Alternatively, the monitoring device may include multiple components, such as a processor or central unit mounted under a car seat or in a trunk of the vehicle and a user interface mounted on a dashboard or windshield. Similarly, monitoring device 101 may have a self-contained antenna in the unit or may be connected to remotely mounted antennas for communication with remote systems.

Vehicle monitoring units 101 may be connected to an onboard diagnostic (OBD) system or control area network (CAN) data bus in the vehicle. Information and data associated with the operation of the vehicle may be collected from the OBD system, such as engine operating parameters, vehicle identification, seatbelt use, door position, etc. The OBD system may also be used to power the vehicle monitoring device. Vehicle monitoring system 101 may receive inputs from internal and external sources and sensors such as accelerometers, global positioning systems (GPS), vehicle onboard diagnostic systems, seatbelt sensors, wireless device, or cell phone use detectors, alcohol vapor detectors, or transdermal ethanol detection. In one embodiment, the vehicle monitoring device is one of the types described in U.S. patent application Ser. No. 11/755,556, filed on May 30, 2007, entitled "System and Method for Evaluating Driver Behavior," the disclosure of which is hereby incorporated by reference herein in its entirety.

Information may be exchanged between vehicle monitoring system 101 and central monitoring system or server 104 in real-time or at intervals. Vehicle monitoring system 101 includes a display, such as a visual monitor that displays data such as driver performance data, grades, insurance data or other information. The display may be a standalone monitor or integral to the dashboard of the vehicle. The display may be audible instead of visual, such as a speaker with voice capabilities. The display may communicate information to the user in other manners, as well.

In some embodiments, the vehicle operation parameters may be transmitted to server 104 via communication network 103, which may be a cellular, satellite, WiFi, WiMAX, Bluetooth, infrared, ultrasound, short wave, microwave or any other suitable network. Communication network 103 may be coupled to server 104 via Internet 110 or any other public or private network. Server 104 may process the parameters and/or store the data to database 105, which may be part of server 104 or a separate device located nearby or at a remote location. Users may access the data on server 104 and database 105 using terminals 106, which may be co-located with server 104 and database 105 or remotely coupled via the Internet 110 or other network connection. In other embodiments, users may access the data on server 104, such as driver performance data, grades, street data, insurance data or other information, using telephones. For example, a user may call a customer service agent, who in turn accesses the data on server 104 for the user, or the user may access data via an interactive voice response (IVR) system.

In some embodiments, the data captured by monitoring system 101 in vehicle 102 may be transmitted via a hardwired communication connection, such as an Ethernet connection that is attached to vehicle 102 when the vehicle is within a service yard or at a base station or near server 104. Alternatively, the data may be transferred via a flash memory, diskette, or other memory device that can be directly connected to server 104 or terminal 106. Data, such as driving performance or warning thresholds, may also be uploaded from central server 104 to vehicle monitoring device 101 in a similar manner.

In one embodiment of the invention, the data captured by vehicle monitoring system 101 is used to monitor, mentor, grade, or otherwise analyze a driver's behavior during certain events. For example, if vehicle 102 is operated improperly, such as speeding, taking turns too fast, colliding with another vehicle, rapid and repeated acceleration/deceleration, or driving in an unapproved area, then monitoring unit 101 or server 104 may assign a lower grade to the driver's performance. Additionally, if the driver's behavior is inappropriate or illegal, such as not wearing a seatbelt or using a cell phone while driving, the driver's performance evaluation may also be lowered even if this activity does not coincide with improper operation of the vehicle.

The driver's behavior and driving performance may be improved by providing mentoring feedback when a particular threshold is violated. Thresholds are set, as described above, for numerous vehicle operating parameters, such as speed, acceleration, and the like. Upon detection that one of these thresholds has been exceeded, such as driving faster than a posted speed limit, the vehicle monitoring system may provide audible and/or visual feedback cues to mentor the driver. For example, an audible warning tone or voice message may indicate that a speed limit has been exceeded. Similarly, a warning light, icon, graphic or text message may be displayed to the driver to indicate that the speed limit has been exceeded. If the driver does not correct the speeding condition or other threshold violation, then a notice may be sent to a central monitoring server, parent, fleet manager or other supervisor or authority. On the other hand, if the driver chooses to follow the mentoring cues and reduces the vehicle's speed to or below the posted speed limit within an acceptable time, then the monitoring system may take into account the degree to which the driver reacted to the mentoring cues.

Additionally, the driver's behavior and driving performance may be used to calculate insurance coverage, including premiums. The insurance coverage may be recalculated in a periodic manner, e.g., monthly or weekly, in a non-periodic manner, or may be calculated in real-time. The insurance coverage may be calculated using the driver grade, as described above. The insurance coverage may also be calculated using the raw driving behavior data, or a combination of the two data. As a part of driver mentoring, the current insurance coverage can be displayed to the driver, visually or audibly or in some other manner. As the driver's behavior and driving performance changes, the current insurance coverage can also change dynamically in real-time. As described above, the insurance coverage can be calculated at the device 101 or the server 104.

In an embodiment, the current insurance coverage includes a base coverage that includes the coverage typical for an entity such as the driver or vehicle, including location and driving grade. As the driver uses the vehicle over time, the insurance coverage cost for the entity may increase upon unsafe driving, and then may decrease as the unsafe driving decreases. It is possible for a safe driver to always have minimum insurance coverage, whether the vehicle remains parked for a period of time or is driven extensively. It is also possible for an unsafe driver to have constantly rising insurance coverage which may result in termination of a policy. The mentoring may be displayed to the driver in a visual meter, either in a standalone device or integral to ordinary displays, such as a radio or GPS device. The meter may include a dollar amount corresponding to insurance coverage, or may communicate the metering in another manner.

Figure 2:
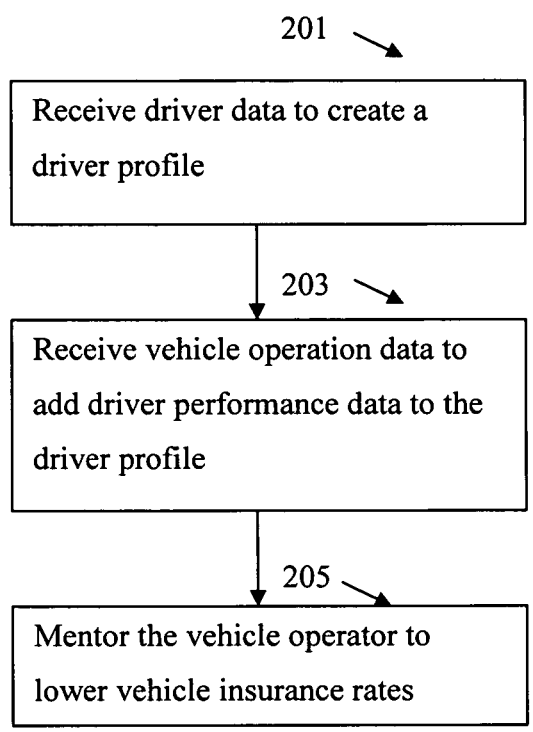
FIG. 2 is a flowchart in accordance with one implementation of the present invention.

FIG. 2 illustrates a mentoring feedback system described above. In step 201, the monitoring unit 101 or server 104 receives data from the driver in order to create a driver profile. During driving, in step 203, the monitoring unit 101 or server 104 receives data in order to create driver performance data associated with the driver profile. In step 205, the monitoring unit 101 provides the driver the mentoring feedback to help lower the driver's insurance premiums.

Figure 3:
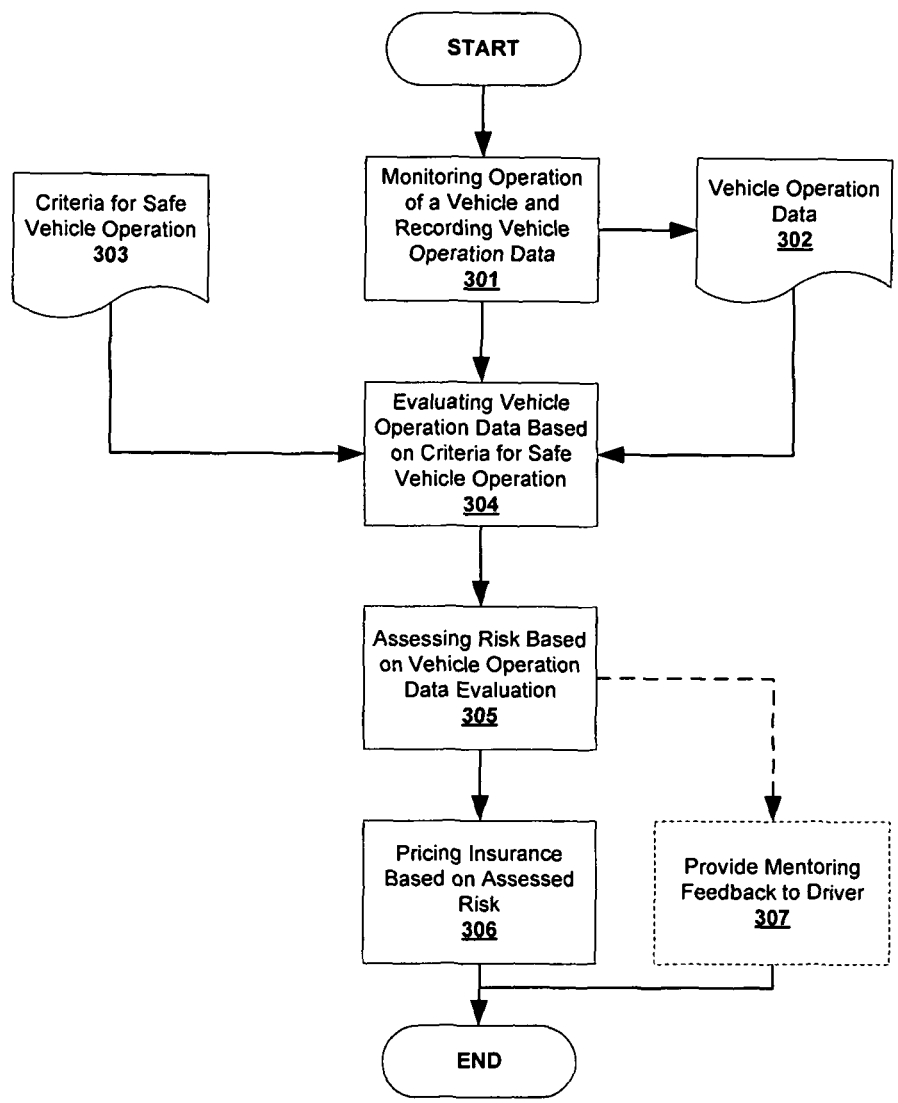
FIG. 3 is a flowchart in accordance with another implementation of the present invention.

Referring to FIG. 3, a method for insurance pricing includes monitoring operation of a vehicle and recording vehicle operation data (step 301). Vehicle operation data 302 includes any data usable to assess risk, such as data usable to assess unsafe driving. For example, vehicle operation data 302 may include vehicle speed associated with a location, vehicle speed associated with a probable speed limit, vehicle speed associated with various environmental conditions, rates of acceleration, rates of deceleration, cornering speeds, vehicle condition, and the like.

At step 304, vehicle operation data is evaluated based on criteria for safe vehicle operation. In an embodiment, step 304 is performed by a vehicle monitoring device 101. The criteria for safe vehicle operation 303 may include a predetermined set of vehicle operation parameters that is associated with safe driving. For example, the criteria may include predetermined vehicle speeds for various geographic locations that are associated with safe vehicle operation.

At step 305, risk is assessed based on the evaluated vehicle operation data. In an embodiment, step 305 is performed by a vehicle monitoring device 101. The risk may be, for example, the risk of a driver getting into an accident. In an embodiment, the risk is assessed based on a grade or score assigned to the driver associated with the vehicle operation data 302 monitored at step 301. A score associated with poor driving behavior can result in a determination that the driver is at a high risk for getting into an accident, whereas a score associated with excellent driving behavior may result in a determination that the driver is at a low risk of getting into an accident.

At step 306, an insurance premium is priced based on the assessed risk. In an embodiment, the insurance is priced higher based on a determination that the driver is at a high risk for getting into an accident, whereas the insurance may be priced lower based on a determination that the driver is at a low risk of getting into an accident. The assessed risk may be used to adjust the price of a current insurance premium or to calculate a future insurance premium. At step 307, the driver is provided with mentoring feedback based on the evaluated vehicle operation data and/or the assessed risk.

The vehicle monitoring system may have the capability of disabling the vehicle under certain conditions. For example, U.S. patent application Ser. No. 11/756,315, entitled "System and Method for Remotely Deactivating a Vehicle," and filed on May 31, 2007, the disclosure of which is hereby incorporated by reference herein in its entirety, discloses a vehicle monitoring system that is adapted to disable or deactivate a vehicle under preset conditions or upon command from an authority or supervisor. In another embodiment of the invention, the preset conditions or command from an authority or supervisor may be associated with an insurance status of the driver. For example, if an insurance company, supervisor, or other authority determines that the vehicle is not registered, the driver is uninsured, underinsured, lacking coverage required in a particular jurisdiction, or that the driver's insurance premiums are delinquent, then the vehicle monitoring system may be directed to disable or deactivate the vehicle, for example, until the situation is remedied. Alternatively, the vehicle monitoring system may provide warnings or other mentoring cues to the driver if it is determined that the vehicle is not registered, the driver is uninsured, underinsured, lacking coverage required in a particular jurisdiction, or that the driver's insurance premiums are delinquent. This alternative would allow the driver to continue to operate the vehicle, but would put the driver on notice that he or she is driving at their own risk.

Driving performance evaluation and grading may be performed by monitoring device 101 and/or by central server 104. The driver's behavior is typically evaluated against predetermined vehicle operation parameters, thresholds or other criteria. The driver's performance may be monitored while driving vehicle 102 with monitoring device 101 installed for some period, such as a number of weeks or months, or for some number of miles driven or for some number of trips, for example. After monitoring device 101 has sufficient exposure to the driver's performance, the driver is assigned a driving grade or category. This grade or category may be assigned by monitoring device 101, or performance data from monitoring device 101 may be provided to central server 104, which may also assign a grade or category to the driver. Each driver's grade, category or other classification may be stored to database 105. Other driver information may also be stored in database 105, such as driver profile data, insurance policy data, contact information, license information and the like.

Driver performance is evaluated against parameters such as speed-by-street data to determine, based upon those parameters, if the driver is speeding and should receive mentoring feedback (i.e. a speeding warning) and/or be subject to a higher or lower grade. Therefore, it is important for the data, such as speed limits in a speed-by-street database, to be as accurate as possible. If the speed-by-street data is incorrect due to changes in posted speed limits, then drivers may be incorrectly warned or penalized for speeding or not warned/penalized due to the speed limit changes. Additionally, street conditions may change, for example, due to construction, increased or decreased traffic, accidents, or other factors. In one embodiment, the present invention provides users with the capability to update speed-by-street data, road conditions and other information so that the most current parameters are used to evaluate drivers. As noted in co-pending application Ser. No. 11/779,178, which as noted above is incorporated herein by reference, if the database speed limit values differ from actual posted speed limits, then driver confidence in the vehicle monitoring and mentoring system may wane due to false alarms or cautions for speeding, for example. Accordingly, there exists a need in the industry for drivers and/or users of a driver monitoring and/or driver mentoring system to notify service providers of such errors in posted and/or system speed limits. The present invention thus provides several methods for reporting speed errors b the users in real-time from a vehicle such as by a pin-pointing technique that allows the driver to mark a location by pressing a button on the vehicle monitoring system in the vehicle when the system incorrectly indicates a speeding violation.

The present invention is also directed to identifying and compensating for differences in speed limits at intersections and/or when two or more roads are in close proximity. For example, when a vehicle passes through an intersection, it is technically traveling on two streets at the same time and each of those streets may have different posted speed limits and/or different speed limits in the speed-by-street database. If a vehicle is traveling on an interstate highway or major road it will likely pass across, over, or under numerous cross streets that may have speed limits that are different from the speed limit for the road the vehicle is actually traveling on. When the vehicle crosses an intersection with one of these cross streets, the vehicle monitoring system may have two or more choices of speed limit thresholds to use for monitoring and mentoring, such as thresholds or speed limits for the main road and the cross street. If the vehicle monitoring system chooses to use the cross street speed limit data while the vehicle crossing the intersection on a main road, then the driver may be incorrectly warned or reported for speeding if the cross street speed limit is lower than the main road. Similarly, if two roads with different speed limits are in close proximity, such as an interstate highway and a frontage road, then the driver may be incorrectly warned or reported for speeding if the vehicle monitoring system uses the wrong speed limit data. The vehicle's GPS position would typically show the user on the proper road, but errors in the mapping data or the GPS information may present times when the vehicle monitoring system would need to select from two or more speed limits.

An averaging approach may be used in one embodiment of the invention to address the problem of intersecting or close streets. In averaging, when a vehicle is at an intersection, the vehicle monitoring system averages the values of the intersecting streets. For example, if the vehicle is traveling at 50 MPH on a street having a 50 MPH speed limit and crosses a street with a 30 MPH speed limit, then the vehicle monitoring system may momentarily determine that the vehicle has exceeded the speed limit by 20 MPH, which is likely to be considered an excessive speeding condition to be reported by the vehicle monitoring system. The averaging approach minimizes the false excessive speeding warnings by averaging the speed limits of the two streets. In the example above, the speed limit threshold used by the vehicle monitoring system at or near the intersection would be 40 MPH (i.e. the average of 30 MPH and 50 MPH). This may incorrectly cause the vehicle monitoring system to determine that the vehicle is speeding by 10 MPH, but the magnitude of the false speeding violation has been reduced and is less likely to cause immediate speeding reporting against the driver. Averaging the speeds may also allow sufficient time for the monitoring vehicle to move away from the complicating intersection whereas the system would revert to the previous and correct speed.

In the alternative, interpretive logic may eliminate false speeding alerts, as described above by analyzing speeds on streets and considering the last street traveled before posting a speeding alert. For example, if one were to go north-bound at 50 mph on a 50 mph posted limit road, and cross a east-west road with a 30 mph posted limit, the logic could identify the north-bound road as your current speed limit based on the near-term, previous speed, the near-term previous posted speed limit, the near-term, previous heading, and other possible factors to rule-out the 30 mph posted limit road as a probability.

In another embodiment, the speed limit averaging may include speed limit values for more than one location, such as a series of locations along a vehicle path. For example, speed limit data for three consecutive locations may be used at, for example, a sampling rate of 30 seconds. Accordingly, when the vehicle is on a 50 MPH street segment having no intersections, the averaged speed limit threshold for three consecutive samples will be 50 MPH (i.e. the average of three 50 MPH samples). However, if the vehicle passes an intersection with a 30 MPH street during one of the samples, then the averaged speed limit threshold will be 45 MPH (i.e. the average of three 50 MPH samples and one overlapping 30 MPH sample). Using this method, the vehicle monitoring system may detect that the vehicle—which is traveling at 50 MPH through the intersection—is speeding by only 5 MPH (i.e. 50 MPH actual speed versus 45 MPH for the averaged speed limit samples). This is less likely to cause a false, incorrect or erroneous speeding report against the driver and, in some embodiments, may not even trigger mentoring feedback to the driver. It will be understood that the sampling rate of the street speed limit may vary and may be faster or slower (e.g. sample every second, 15 seconds, or minute) depending upon user or operator preference. Also, the number of speed limit samples that are averaged may be increased or decreased depending on user or operator preference. By adjusting the sample rate and number of samples, the false speeding violation detections in the vehicle monitoring system may be significantly reduced.

In another embodiment, the sample rate of the vehicle's speed may be increased or decreased at or near intersections to avoid erroneous speeding violation reports. For example, if the sample rate was reduced at or near an intersection, or if the speed thresholds were ignored at intersections, then it would be less likely for the vehicle monitoring system to make a false speeding determination. Because a vehicle is likely to move through the intersection quickly, temporarily ignoring the speeding thresholds in the intersection is unlikely to have a significant effect on the vehicle monitoring system's monitoring and mentoring functions. Moreover, if an actual speeding condition is occurring, then the vehicle monitoring system will detect and report this condition once the vehicle is out of the intersection. In one embodiment, the determination to use or ignore speed limit thresholds at intersections may depend upon the speed limit for the street on which the vehicle is traveling. For example, if the vehicle is traveling on a street with a speed limit of 50 MPH or above, then it is likely that the vehicle will pass intersections with streets having speed limits of 30 MPH or below, which may create a false speeding violation of 20 MPH or more. Accordingly, when traveling on streets with speed limits above 50 MPH or some other speed limit value, the vehicle monitoring system may ignore speeding violations or may not make a speeding determination or analysis at or near intersections.

In a further embodiment of the invention, the vehicle's heading or directional information is used to determine the proper speed limit threshold data that should be used by the vehicle monitoring system. The vehicle monitoring system receives GPS data, which may include heading information for the vehicle. Alternatively, the vehicle monitoring system may calculate the vehicle's heading from two or more reports of the vehicle's location. By comparing the vehicle's heading to the orientation of the streets at an intersection or streets in close proximity, the vehicle monitoring system may eliminate or reduce the use of incorrect speed limit data. If the vehicle is traveling eastbound on a street that intersects a north-south street, then, at or near the intersection, the vehicle monitoring system may determine the vehicle's heading (i.e. east) and select speed limit data for the street that most closely matches the vehicle's heading. Depending on the accuracy of the speed-by-street mapping data and the GPS heading calculation, the vehicle monitoring system may use heading information to eliminate potentially incorrect speed limit thresholds for streets that intersect not only at right angles, but also at more acute angles. The vehicle's most recent heading may be used to select the speed limit threshold to be used. Alternatively, the vehicle's heading over a period of time may be averaged, if desired, and the average used to select the threshold speed limit data. The sampling rate of the vehicle's heading may be increased or decreased, as desired, to improve the accuracy of the speed limit analysis. For example, when a dramatic drop in the speed limit threshold is detected, the vehicle monitoring system may compare the most recent heading and the previous posted speed at that heading. The vehicle monitoring system may then continue to use the previous posted speed and increase the sample rate until the speed limit data stabilizes again.

The techniques described herein may be used for purposes of insurance pricing and driver mentoring in vehicles having multiple drivers, such as, for example, a family car. This would allow the vehicle to be insured for an unknown driver or number of drivers.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system of mentoring a driver of a vehicle to provide the driver with awareness of how the driver's behavior while operating the vehicle affects the driver's insurance rating, the system comprising:

a plurality of sensors installed in a vehicle which detect parameters from which data is derived that defines the following information: i) where the vehicle is being driven, ii) date and time as to when the vehicle is being driven, iii) how the vehicle is being operated, iv) road conditions, v) whether vehicle equipment is being correctly used, and vi) one or more driver behaviors that are related to safe driving behaviors;

an on-board vehicle monitoring system which comprises system memory and one or more processors for data processing, and which receives as inputs i) the detected parameters from said plurality of sensors installed in the vehicle, ii) thresholds which define criteria against which one or more of the detected parameters are evaluated, and iii) identification information for the driver of the vehicle;

the on-board vehicle monitoring system using the one or more processors to evaluate the input detected parameters by performing the following computer-implemented data processing:

determining a particular date, time and street where the vehicle is traveling; and determining from the input parameters and the one or more thresholds whether one or more of the following violations is occurring: the vehicle is being operated in an unsafe manner, the driver of the vehicle is engaging in unsafe behavior, or vehicle equipment is failing to be properly utilized or is being improperly utilized;

one or more processors determining an impact for one or more determined violations on an insurance rating for the driver or an entity associated with driver, the one or more processors comprising either the same one or more processors of the on-board vehicle monitoring system, or one or more processors different from the on-board vehicle processors;

a warning device installed in the vehicle that provides in real-time a discernible warning to the driver of the vehicle of how a determined violation is impacting the insurance rating;

at the on-board vehicle monitoring system, in response to a warning provided by the on-board vehicle monitoring system, observing by the driver that the warning is inconsistent with actual driving conditions and then activating in response to a single driver input a real-time error indication that a warning issued by the vehicle monitoring system to the driver of the vehicle is an error based on the vehicle driver's observation of the actual traffic conditions or vehicle operation; and so that the most current parameters are used to evaluate drivers, in response to said activation by the driver of said error indication, the vehicle monitoring system performing the following:

storing in system memory the data for the error indication, including identification of the driver, a particular street location, the date and time the vehicle was traveling on the particular street, and vehicle operation; and sending to a central server or database said data for the error indication in order to enable evaluation of the driver using the most current parameters.

2. The system of claim 1, wherein the detected parameters comprise a given location of the vehicle and a speed limit associated with the location, and the speed of the vehicle at the given location, and wherein the one or more processors of the on-board vehicle monitoring system perform the following data processing: determining whether more than one speed limit may be associated with the given location, and then determining which speed limit is the most likely correct speed limit for the given location.

3. The system of claim 2, wherein determining which speed limit is the most likely correct speed limit for the given location comprises determining an average speed limit from a plurality of possible speed limits associated with the given location.

4. The system of claim 2, wherein determining which speed limit is the most likely correct speed limit for the given location is based at least in part upon heading information associated with the vehicle.

5. The system of claim 1, wherein the detected parameters comprise a given location of the vehicle and a speed limit associated with the location, and the speed of the vehicle at the given location, and wherein the error activation mechanism comprises an interface adapted to receive from the driver an input indicating that the speed limit associated with the location is an error so that the detected speed of the vehicle is not determined to be in excess of a speed threshold.

6. The system of claim 5, wherein the one or more processors are located remotely from the interface system.

7. The system of claim 5, wherein the one or more processors are located proximately to the interface system.

8. The system of claim 1, wherein the said impact for the one or more determined violations on the driver's insurance rating is determined in real-time.

9. The system of claim 8, wherein the impact for the one or more determined violations on the driver's insurance rating comprises a future cost of insuring the driver or another entity associated with the driver.

10. The system of claim 1, wherein the detected parameters are adjustable by adjusting a sampling rate of one or more of said installed sensors.

11. A method of mentoring a driver of a vehicle to provide the driver with awareness of how the driver's behavior while operating the vehicle affects the driver's insurance rating, the method comprising:

detecting at a plurality of sensors installed in a vehicle parameters from which data is derived that defines the following information: i) where the vehicle is being driven, ii) date and time as to when the vehicle is being driven, iii) road conditions, iv) how the vehicle is being operated, v) whether vehicle equipment is being correctly used, and vi) one or more driver behaviors that are related to safe driving behaviors;

inputting to an on-board vehicle monitoring system which comprises system memory and one or more processors for data processing, i) the detected parameters from said plurality of sensors installed in the vehicle, ii) thresholds which define criteria against which the detected parameters are evaluated, and iii) identification information for the driver of the vehicle;

the on-board vehicle monitoring system evaluating the input detected parameters by performing the following computer-implemented data processing:

determining a particular date, time and street where the vehicle is traveling; and determining from the input parameters and the thresholds whether one or more of the following violations is occurring: the vehicle is being operated in an unsafe manner, the driver of the vehicle is engaging in unsafe behavior, or vehicle equipment is failing to be properly utilized or is being improperly utilized;

determining an impact for one or more determined violations on an insurance rating for the driver or an entity associated with the driver;

providing in real-time a discernible warning to the driver of the vehicle of how a determined violation is impacting the insurance rating;

at the on-board vehicle monitoring system, in response to a warning provided by the on-board vehicle monitoring system, observing by the driver that the warning is inconsistent with actual driving conditions and then activating in response to a single driver input a real-time error indication that a warning issued by the vehicle monitoring system to the driver of the vehicle is an error based on the vehicle driver's observation of the actual traffic conditions or vehicle operation; and so that the most current parameters are used to evaluate drivers, in response to said activation by the driver of said error indication, the vehicle monitoring system performing the following:

storing in system memory the data for the error indication, including identification of the driver, a particular street location, the date and time the vehicle was traveling on the particular street, and vehicle operation; and sending to a central server or database said data for the error indication in order to enable evaluation of the driver using the most current parameters.

12. The method of claim 11, wherein the impact for the one or more determined violations on the driver's insurance rating comprises a future cost of insuring the driver or another entity associated with the driver.

13. The method of claim 11, wherein the detected parameters comprise a given location of the vehicle and a speed limit associated with the location, and the speed of the vehicle at the given location, and wherein the error indication comprises receiving from the driver an input indicating that the speed limit associated with the location is an error so that the detected speed of the vehicle is not determined to be in excess of a speed threshold.

14. The method of claim 13, wherein the interface is included as part of the on-board monitoring system and is in direct communication with the one or more processors.

15. The method of claim 13, wherein the interface is a website or portal accessed via an Internet connection.

16. The method of claim 11, wherein the impact for the one or more determined violations on the driver's insurance rating comprises a graded evaluation.

17. One or more hardware memory devices containing computer-executable instructions, which, when executed by one or more processors, implementing a method of mentoring a driver of a vehicle to provide the driver with awareness of how the driver's behavior while operating the vehicle affects the driver's insurance rating, the computer-implemented method comprising:

receiving as inputs at an on-board vehicle monitoring system which comprises system memory and one or more processors, data derived from a plurality of sensors installed in a vehicle, the data corresponding to parameters that define the following information: i) where the vehicle is being driven, ii) date and time as to when the vehicle is being driven, iii) how the vehicle is being operated, iv) road conditions, v) whether vehicle equipment is being correctly used, and vi) one or more driver behaviors that are related to safe driving behaviors;

inputting to the on-board vehicle monitoring system i) thresholds which define criteria against which the received inputs for said parameters are evaluated, and ii) identification information for the driver of the vehicle;

the on-board vehicle monitoring system evaluating the received inputs for said parameters by performing the following computer-implemented data processing:
  determining a particular date, time and street where the vehicle is traveling;
  determining from the input parameters and the thresholds whether at least one or more of the following violations is occurring: the vehicle is being operated in an unsafe manner, the driver of the vehicle is engaging in unsafe behavior, or vehicle equipment is failing to be properly utilized or is being improperly utilized;
  determining, at one or more processors that may be either the same as the one or more processors of the on-board vehicle monitoring system, or different therefrom, an impact for one or more determined violations on an insurance rating of the driver or an entity associated with the driver;
  providing in real-time a discernible warning to the driver of the vehicle of how a determined violation is impacting the driver's insurance rating;
at the on-board vehicle monitoring system, in response to a warning provided by the on-board vehicle monitoring system, observing by the driver that the warning is inconsistent with actual driving conditions and then activating in response to a single driver input a real-time error indication that a warning issued by the vehicle monitoring system to the driver of the vehicle is an error based on the vehicle driver's observation of the actual traffic conditions or vehicle operation; and so that the most current parameters are used to evaluate drivers, in response to said activation by the driver of said error indication, the vehicle monitoring system performing the following:
  storing in system memory the data for the error indication, including identification of the driver, a particular street location, the date and time the vehicle was traveling on the particular street, and vehicle operation; and
  sending to a central server or database said data for the error indication in order to enable evaluation of the driver using the most current parameters.

18. The one or more hardware memory devices for implementing the computer method of claim 17, wherein the impact for the one or more determined violations on the driver's insurance rating comprises a future cost of insuring the driver or another entity associated with the driver.

19. The one or more hardware memory devices for implementing the computer method of claim 17, wherein the detected parameters comprise a given location of the vehicle and a speed limit associated with the location, and the speed of the vehicle at the given location, and wherein the error indication comprises receiving from the driver an input indicating that the speed limit associated with the location is an error so that the detected speed of the vehicle is not determined to be in excess of a speed threshold.

20. The one or more hardware memory devices for implementing the computer method of claim 19, wherein the interface is included as part of the on-board monitoring system and is in direct communication with the one or more processors.

21. The one or more hardware memory devices for implementing the computer method of claim 19, wherein the interface is a website or portal accessed via an Internet connection.

22. The one or more hardware memory devices for implementing the computer method of claim 17, wherein the impact for the one or more determined violations on the driver's insurance rating comprises a graded evaluation.

* * * * *

UNITED STATES PATENT AND TRADEMARK OFFICE
CERTIFICATE OF CORRECTION

| | | |
|---|---|---|
| PATENT NO. | : 9,117,246 B2 | Page 1 of 1 |
| APPLICATION NO. | : 12/379083 | |
| DATED | : August 25, 2015 | |
| INVENTOR(S) | : McClellan | |

It is certified that error appears in the above-identified patent and that said Letters Patent is hereby corrected as shown below:

In the Specification:

Column 7
Line 32, change "errors b the" to --errors by the--.

Signed and Sealed this
Sixteenth Day of August, 2016

Michelle K. Lee
*Director of the United States Patent and Trademark Office*